United States Patent [19]
Wible

[11] 3,772,569
[45] Nov. 13, 1973

[54] GROUND FAULT PROTECTIVE SYSTEM
[75] Inventor: Paul E. Wible, Alamo, Calif.
[73] Assignee: The Rucker Company, Oakland, Calif.
[22] Filed: Sept. 5, 1972
[21] Appl. No.: 286,145

[52] U.S. Cl. .......... 317/18 D, 317/27 R, 317/335 C
[51] Int. Cl. ............................................. H02h 1/02
[58] Field of Search ............ 317/18 D, 27 R, 335 C; 340/253 H, 253 N, 253 Q

[56] References Cited
UNITED STATES PATENTS
3,611,035  10/1971  Douglas ............................ 317/18 D
3,638,072  1/1972  Kobayashi ........................ 317/18 D Primary Examiner—J. D. Miller
Assistant Examiner—Harvey Fendelman
Attorney—Paul D. Flehr et al.

[57] ABSTRACT

Ground fault protective system including means for detecting grounding of the neutral conductor independently of the means for detecting ground faults. The secondary winding of a transformer is connected in series with the neutral conductors, and the primary winding of the transformer is energized. Grounding of the neutral conductor is detected by an increase in the primary current.

3 Claims, 2 Drawing Figures

PATENTED NOV 13 1973　　　　　　　　　　　　　　3,772,569

GROUND FAULT PROTECTIVE SYSTEM

BACKGROUND OF THE INVENTION

This invention pertains generally to electrical safety devices and more particularly to a ground fault protective system which includes means for detecting grounding of the neutral conductor.

In recent years, ground fault interrupters (GFI's) have come into increasingly wider use in protecting human life and property against harmful shock and damage. These devices generally include means for monitoring the flow of current in the line and neutral conductors of a distribution system and interrupting the flow in the event of an imbalance in the monitored currents, as would happen if a person came into contact with the line conductor. In order to prevent the system from being rendered inoperative by grounding of the neutral conductor, some prior art devices have included means for inducing a current in the neutral conductor in the event that it becomes grounded. This current creates an imbalance which is sensed by the GFI, causing the GFI to interrupt the flow of current as it would in the event of a ground fault.

SUMMARY AND OBJECTS OF THE INVENTION

In the ground fault protective system of the present invention, means is provided for detecting grounding of the neutral conductor independently of the means for detecting ground faults. The means for detecting neutral grounding includes a transformer having a secondary winding connected in series with the neutral conductor. The primary winding of this transformer is energized, and neutral grounding is detected by an increase in the primary current.

It is in general, an object of the invention to provide a new and improved ground fault protective system with means for grounded neutral detection.

Another object of the invention is to provide a ground fault protective system of the above character in which the means for detecting grounding of the neutral conductor operates independently of the means for detecting a ground fault.

Additional objects and features of the invention will be apparent from the following description in which the preferred embodiments are set forth in detail in conjunction with the accompanying drawing.

DESCRIPTION OF THE PREFERRED EMBODIMENTS

Figure 1:
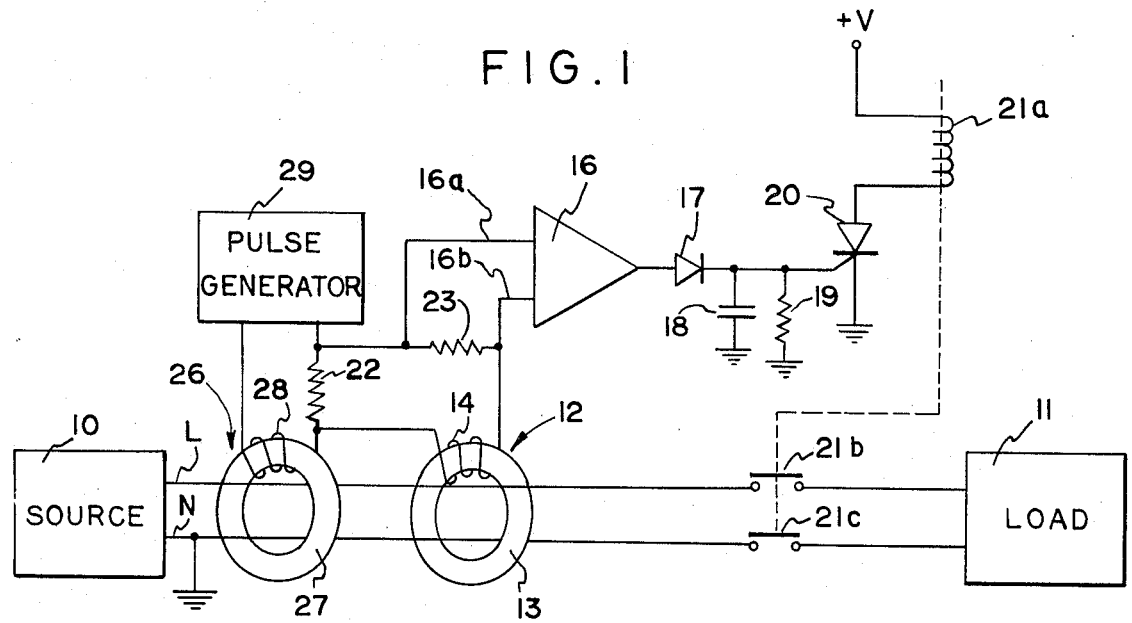
FIG. 1 is a block and schematic diagram illustrating one embodiment of a protective system incorporating the invention.

In the drawing, the invention is shown in connection with a two-wire, single-phase system in which a line conductor L and a neutral conductor N interconnect a source 10 and a load 11. As illustrated, the neutral conductor is connected to ground at its source end.

Means is provided for monitoring the flow of current in the line and neutral conductor and providing a fault signal in the event that the current flowing toward the load is not equal to the current flowing toward the source. This means includes a differential transformer 12 having a toroidal chord 13 through which the line and neutral conductors pass to form single-turn primary windings. A secondary winding 14 is wound on the core, and a fault signal is produced in this winding in the event that the currents and the line in neutral conductors are not equal.

The output of differential transformer 12 is applied to signal conditioning means which is illustrated in simplified form as consisting of an amplifier 16, a rectifier 17, an accumulator capacitor 18, a bleeder resistor 19, a silicon controlled rectifier 20, and a circuit breaker 21 having a trip coil 21a and contacts 21b and 21c connected in the line and neutral conductors. In this conditioning circuit, fault signals are amplified and stored until the charge on capacitor 18 reaches the level required to fire SCR 20. When the SCR fires, the circuit breaker trip coil is energized, and the contacts are opened. A circuit of this type is disclosed in greater detail in copending application Ser. No. 141,297, filed May 7, 1971 and assigned to the assignee herein.

One end of secondary winding 14 of the differential transformer is connected to one input 16a of amplifier 16 through a resistor 22, and the other end of the winding is connected directly to the other input 16b of the amplifier. A resistor 23 is connected between the amplifier inputs, and this resistor preferably has a value substantially larger than the value of resistor 22 so that substantially all of the fault signals induced in winding 14 will appear at the inputs of amplifier 16. For example, resistor 23 can have a resistance on the order of 750 ohms, and the resistor 22 can be on the order of 75 ohms.

Means is provided for inducing a current in the neutral conductor in the event that this conductor becomes grounded. This means includes a transformer 26 having a core 27 on which a primary winding 28 is wound. The line and neutral conductors pass through core 27 to form single-turn secondary windings. Primary winding 28 is energized by means of a pulse generator 29 which is connected directly to one end of the winding and connected to the other end of the winding through resistor 22.

Operation and use of the embodiment shown in FIG. 1 can be described briefly. In the absence of a ground fault, the currents flowing in the line and neutral conductors are balanced, and the output of differential transformer 12 is zero. If a ground fault occurs, a fault signal will be induced in winding 14, and this signal will be amplified and applied to capacitor 18. When the change on the capacitor reaches the level required to fire SCR 20, trip coil 21a will be energized, and the breaker contacts will be opened.

Pulse generator 29 operated continuously, and the current supplied by this generator to primary winding 28 passes through resistor 22. The voltage developed across this resistor is amplified by amplifier 16 and supplied to capacitor 18. As long as the neutral conductor remains ungrounded, the reflected impedance of the winding formed by this conductor is high, and the current in primary winding 28 remains low. The values of capacitor 18 and resistor 19 are such that the voltage produced by this normal primary current is insufficient to charge the capacitor to the level required to fire the SCR. In the event that the neutral conductor becomes grounded, the reflected impedance will become low, and the current drawn by primary winding 28 will increase, producing an increased voltage drop across resistor 22. When amplified, this increased voltage will charge the capacitor to the level required to fire the SCR, and the breaker contacts will be open.

Since the line conductor also passes through transformer core 27, in the event that this conductor is connected to another ungrounded conductor, the impedence of the winding formed by the line conductor will decrease, causing a large current to flow in primary winding 28 and resistor 22. This will also cause the breaker contacts to open.

Figure 2:
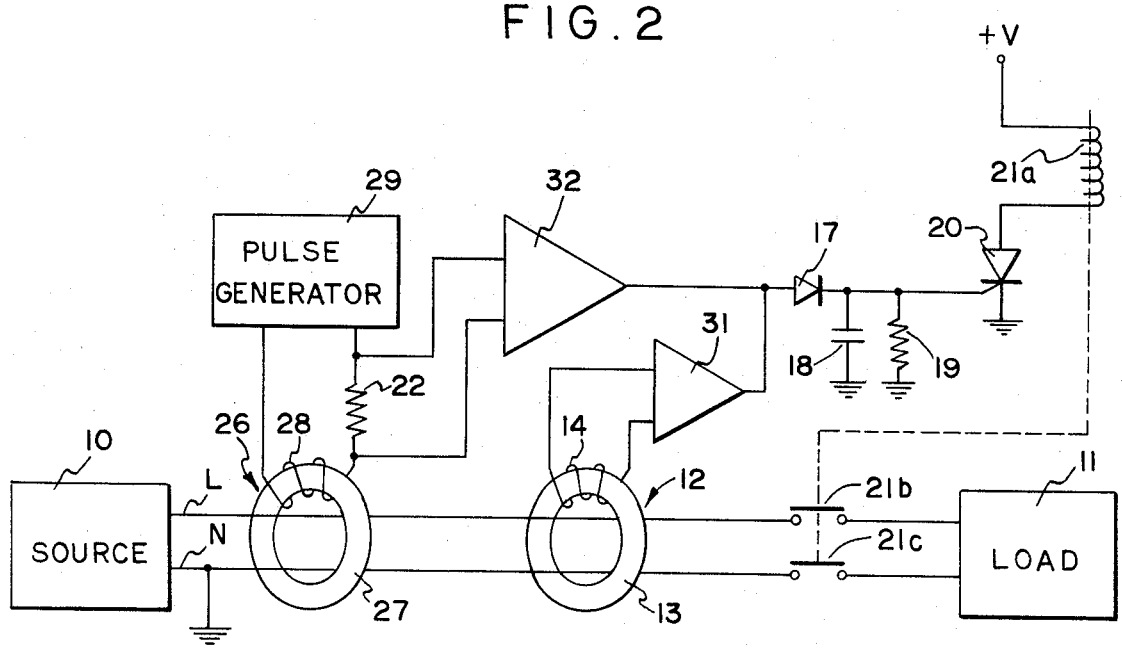
FIG. 2 is a block and schematic diagram illustrating another embodiment of a protective system incorporating the invention.

The embodiment illustrated in FIG. 2 is generally similar to that shown in FIG. 1, except that separate amplifiers are provided for the fault signal produced by the differential transformer and for the alarm signal produced across resistor 22 when the neutral conductor is grounded. Like reference numerals are used to designate corresponding elements in the two figures. In the embodiment of FIG. 2, the ends of differential transformer secondary winding 14 are connected directly to inputs of an amplifier 31. The output of this amplifier is connected to rectifier 17, accumulator capacitor 18, bleeder resistor 19, and SCR 20. The two ends of resistor 22 are connected to the inputs of a second amplifier 32, and the output of this amplifier is connected parallel with the output of amplifier 31. Alternatively, the output of amplifier 32 can be connected to separate indicator or control circuit.

Operation and use of the embodiment illustrated in FIG. 2 is generally similar to that of the embodiment shown in FIG. 1. Now, however, fault signals produced in the secondary winding of the differential transformer are amplified by amplifier 31, and the voltage developed across resistor 22 by the primary current in winding 28 is applied to amplifier 32. The gains of these amplifiers can be adjusted independently to provide independent adjustments of the sensitivity of the system to ground faults and neutral groundings.

While the invention has been described in connection with a particular type of ground fault responsive circuit, it should be understood that the invention can be utilized with other types of ground fault circuits such as those described in U.S. Pat. Nos. 3,213,321, issued Oct. 19, 1965; 3,614,533, issued Oct. 19, 1971; and 3,591,656, issued Aug. 3, 1971. Similarly, the invention can be utilized with ground fault detectors and indicators as well as ground fault protective system has been provided. While only the presently preferred embodiments have been described, as will be apparent to those familiar with the art, certain changes and modifications can be made without departing from the scope of the invention as defined by the following claims.

I claim:

1. In a ground fault protective system for use with line and neutral conductors interconnecting a source and a load, the neutral conductor being connected to ground near the source, sensing means for monitoring the flow of current in the line and neutral conductors and providing a fault signal in the event that the current flowing toward the load is not equal to the current flowing toward the source, a transformer having a primary winding and a secondary winding, said secondary winding being connected electrically in series with the neutral conductor, means for energizing the primary winding, means connected to the primary winding for monitoring the flow of current therein and providing an alarm signal if said current exceeds a predetermined level, and circuit means responsive to the fault and alarm signals.

2. A ground fault protective system as in claim 1 wherein the transformer includes a core through which the neutral conductor passes to form the secondary winding.

3. A ground fault protective system as in claim 1 wherein the transformer includes an additional secondary winding connected electrically in series with the line conductor.

* * * * *